US012581429B2

(12) United States Patent
Choi et al.

(10) Patent No.: US 12,581,429 B2
(45) Date of Patent: Mar. 17, 2026

(54) ELECTRONIC APPARATUS FOR ALLOCATING TRANSMISSION POWER BASED ON COMMUNICATION CAPABILITY OF TERMINAL AND METHOD OF OPERATING THE SAME

(71) Applicant: AGENCY FOR DEFENSE DEVELOPMENT, Daejeon (KR)

(72) Inventors: Hyeok Gyu Choi, Daejeon (KR); Seung Ho Kim, Daejeon (KR); Chul Hee Choi, Daejeon (KR); Ju Hyung Lee, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 444 days.

(21) Appl. No.: 17/891,225

(22) Filed: Aug. 19, 2022

(65) Prior Publication Data

US 2023/0068264 A1     Mar. 2, 2023

(30) Foreign Application Priority Data

Aug. 24, 2021     (KR) ........................ 10-2021-0111645

(51) Int. Cl.
H04W 52/34          (2009.01)
H04W 72/044        (2023.01)

(52) U.S. Cl.
CPC ..... H04W 52/346 (2013.01); H04W 72/0473 (2013.01)

(58) Field of Classification Search
CPC ........................ H04W 52/346; H04W 72/0473
See application file for complete search history.

(56) References Cited

U.S. PATENT DOCUMENTS

| | | | | |
|---|---|---|---|---|
| 11,425,608 B2 * | 8/2022 | Wang | ...................... | H04W 8/24 |
| 11,617,108 B2 * | 3/2023 | Wang | ................... | H04W 52/367 |
| | | | | 455/450 |
| 2003/0048856 A1 * | 3/2003 | Ketchum | .............. | H04L 1/0009 |
| | | | | 375/260 |
| 2005/0060411 A1 * | 3/2005 | Coulombe | .............. | H04L 67/56 |
| | | | | 709/227 |
| 2005/0096061 A1 * | 5/2005 | Ji | ........................... | H04W 16/02 |
| | | | | 455/450 |
| 2010/0248774 A1 * | 9/2010 | Huang | ................... | H04L 12/10 |
| | | | | 455/522 |
| 2015/0237639 A1 * | 8/2015 | Garrett | ................ | H04W 52/241 |
| | | | | 370/329 |
| 2016/0014785 A1 * | 1/2016 | Benjebbour | ........ | H04W 52/241 |
| | | | | 370/329 |
| 2017/0048882 A1 * | 2/2017 | Li | ......................... | H04L 5/0051 |
| 2017/0289920 A1 | 10/2017 | Liu et al. | | |

(Continued)

FOREIGN PATENT DOCUMENTS

| | | |
|---|---|---|
| KR | 20170127286 A | 11/2017 |
| KR | 20180125613 A | 11/2018 |

(Continued)

*Primary Examiner* — Junpeng Chen
(74) *Attorney, Agent, or Firm* — MILES & STOCKBRIDGE, P.C.

(57)          ABSTRACT

Disclosed is a technology for performing, in an electronic apparatus included in a central station, an uplink- or down-link-related operation by allocating a transmission power intensity based on a transmission and reception capability of a terrestrial terminal.

9 Claims, 11 Drawing Sheets

(56)                    References Cited

U.S. PATENT DOCUMENTS

| | | | | |
|---|---|---|---|---|
| 2017/0367054 | A1* | 12/2017 | Kim | ...................... H04L 1/0007 |
| 2018/0234867 | A1* | 8/2018 | Wang | ................ H04W 72/0473 |
| 2021/0028830 | A1 | 1/2021 | Kim et al. | |
| 2021/0037482 | A1 | 2/2021 | Shin et al. | |
| 2023/0085090 | A1* | 3/2023 | Matsumura | ........... H04L 5/0051 |
| | | | | 370/329 |

FOREIGN PATENT DOCUMENTS

| | | | |
|---|---|---|---|
| KR | 20210012571 | A | 2/2021 |
| KR | 20210015562 | A | 2/2021 |
| WO | 2015171422 | A1 | 11/2015 |

* cited by examiner

210

First terrestrial
terminal

Second terrestrial
terminal 220            230

FIG. 8

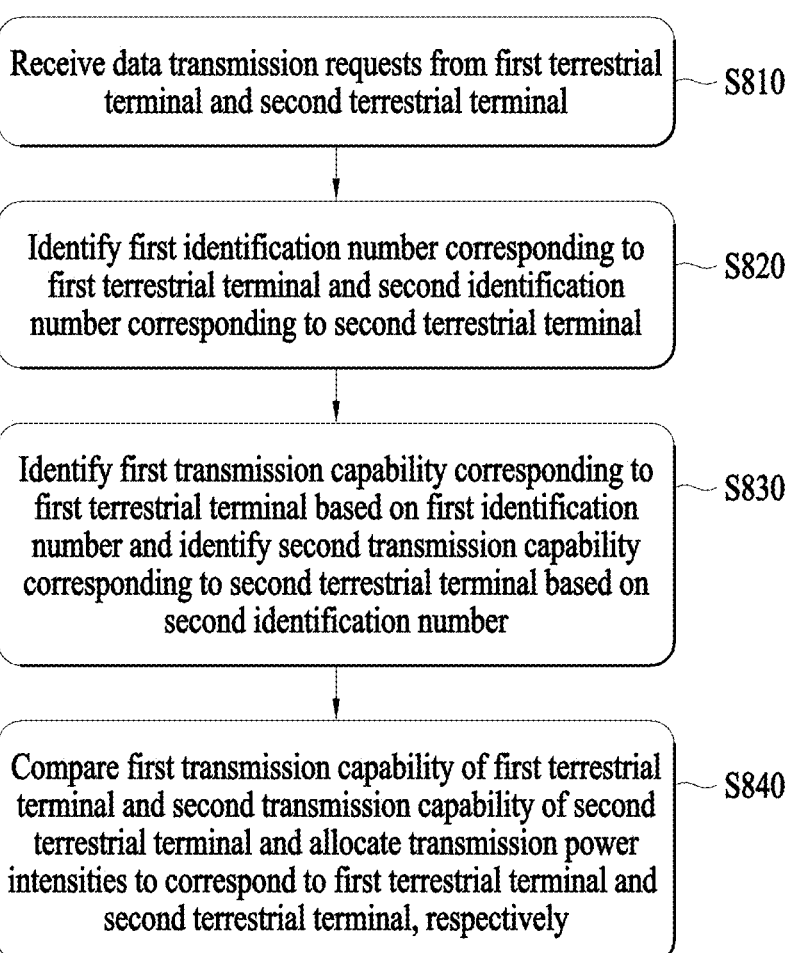

Receive data transmission requests from first terrestrial terminal and second terrestrial terminal — S810

Identify first identification number corresponding to first terrestrial terminal and second identification number corresponding to second terrestrial terminal — S820

Identify first transmission capability corresponding to first terrestrial terminal based on first identification number and identify second transmission capability corresponding to second terrestrial terminal based on second identification number — S830

Compare first transmission capability of first terrestrial terminal and second transmission capability of second terrestrial terminal and allocate transmission power intensities to correspond to first terrestrial terminal and second terrestrial terminal, respectively — S840

FIG. 9

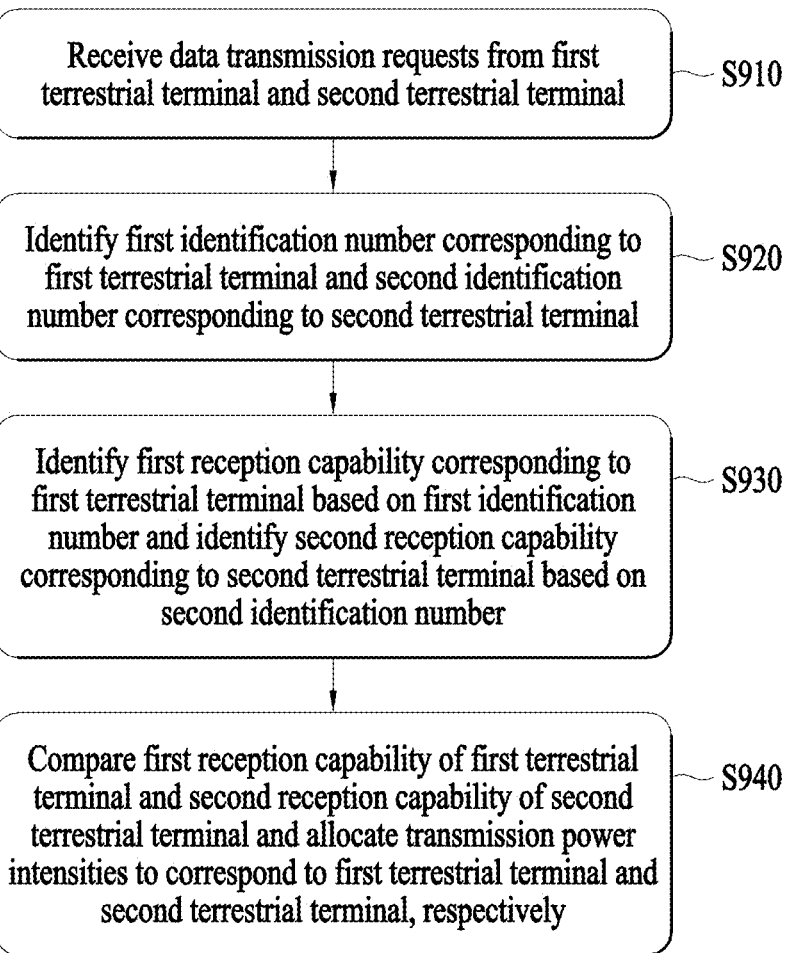

Receive data transmission requests from first
terrestrial terminal and second terrestrial terminal — S910

Identify first identification number corresponding to
first terrestrial terminal and second identification
number corresponding to second terrestrial terminal — S920

Identify first reception capability corresponding to
first terrestrial terminal based on first identification
number and identify second reception capability
corresponding to second terrestrial terminal based on
second identification number — S930

Compare first reception capability of first terrestrial
terminal and second reception capability of second
terrestrial terminal and allocate transmission power
intensities to correspond to first terrestrial terminal and
second terrestrial terminal, respectively — S940

1

ELECTRONIC APPARATUS FOR ALLOCATING TRANSMISSION POWER BASED ON COMMUNICATION CAPABILITY OF TERMINAL AND METHOD OF OPERATING THE SAME

CROSS-REFERENCE TO RELATED APPLICATION(S)

This application claims the benefit of Korean Patent Application No. 10-2021-0111645, filed on Aug. 24, 2021, in the Korean Intellectual Property Office, which is incorporated herein by reference.

BACKGROUND

1. Field of the Invention

Example embodiments of the present invention relate to technology for identifying a channel state using transmission and reception capability information of a terminal in a satellite communication system to which non-orthogonal multiple access (NOMA) is applied and allocating transmission power based on the identified channel state.

2. Description of the Related Art

Non-orthogonal multiple access (NOMA) is a technology for improving frequency utilization efficiency and connectivity by transmitting multiple user signals at the same time to overlap the signals and canceling signal-to-signal interference based on successive interference cancellation in a receiver. In this technology, it is important to check a state of a channel between a transmitter and the receiver. For this, the state of the channel between the transmitter and the receiver may be consistently or periodically monitored so that the monitoring result is provided to the receiver. In this process, a separate channel and a device are used for monitoring the channel state and reporting the result. Accordingly, there is a desire for a technology for implementing a non-orthogonal multiple access technique more simply and efficiently compared to the above-described technology using the channel monitoring.

SUMMARY

An aspect provides a technology for identifying a channel state using transmission and reception capability information of a terminal in a satellite communication system to which non-orthogonal multiple access is applied without needing to use a separate device and allocating transmission power based on the identified channel state. Technical goals of the present invention are not limited to the aforementioned technical features, and other unstated technical goals may be inferred from the example embodiments.

According to an aspect, there is provided systems, devices, methods, and instructions for performing an uplink-related operation in an electronic apparatus, including receiving data transmission requests from a first terrestrial terminal and a second terrestrial terminal, identifying a first identification number corresponding to the first terrestrial terminal and a second identification number corresponding to the second terrestrial terminal, identifying a first transmission capability corresponding to the first terrestrial terminal based on the first identification number and identifying a second transmission capability corresponding to the second terrestrial terminal based on the second identification number, and comparing the first transmission capability of the first terrestrial terminal and the second transmission capability of the second terrestrial terminal and allocating transmission power intensities to correspond to the first terrestrial terminal and the second terrestrial terminal, respectively.

The systems, devices, methods, and instructions may further include allocating channels used for receiving signals having the allocated transmission power intensities in response to the data transmission requests.

When the first transmission capability is relatively higher than the second transmission capability, the allocating of the transmission power intensities may include allocating a relatively high transmission power intensity to the first terrestrial terminal compared to the second terrestrial terminal.

The systems, devices, methods, and instructions may further include demodulating a first signal transmitted by the first terrestrial terminal in signals received based on the transmission power intensities corresponding to the first terrestrial terminal and the second terrestrial terminal, and then demodulating a second signal in the received signals in which the first signal is eliminated.

The first transmission capability and the second transmission capability may be identified from a predetermined database corresponding to a transmission capability of a terrestrial terminal based on the first identification number and the second identification number.

According to another aspect, there is also provided systems, devices, methods, and instructions for performing a downlink-related operation in an electronic apparatus, including receiving data transmission requests from a first terrestrial terminal and a second terrestrial terminal, identifying a first identification number corresponding to the first terrestrial terminal and a second identification number corresponding to the second terrestrial terminal, identifying a first reception capability corresponding to the first terrestrial terminal based on the first identification number and identifying a second reception capability corresponding to the second terrestrial terminal based on the second identification number, and comparing the first reception capability of the first terrestrial terminal and the second reception capability of the second terrestrial terminal and allocating transmission power intensities to correspond to the first terrestrial terminal and the second terrestrial terminal, respectively.

When the first reception capability is relatively higher than the second reception capability, the allocating of the transmission power intensities may include allocating a relatively low transmission power intensity to the first terrestrial terminal compared to the second terrestrial terminal.

The systems, devices, methods, and instructions may further include overlapping a first signal corresponding to the first terrestrial terminal with a second signal corresponding to the second terrestrial terminal and transmitting an overlapped signal through the downlink, wherein the first signal and the second signal have the allocated transmission power intensities.

The first reception capability and the second reception capability may be identified from a predetermined database corresponding to a reception capability of a terrestrial terminal based on the first identification number and the second identification number.

According to another aspect, there is also provided an electronic apparatus including a communication device configured to receive data transmission requests from a first terrestrial terminal and a second terrestrial terminal, a memory in which at least one instruction is stored, and a controller configured to identify a first identification number corresponding to the first terrestrial terminal and a second identification number corresponding to the second terrestrial terminal, identify a first transmission capability corresponding to the first terrestrial terminal based on the first identification number, identify a second transmission capability corresponding to the second terrestrial terminal based on the second identification number, compare the first transmission capability of the first terrestrial terminal and the second transmission capability of the second terrestrial terminal, and allocate transmission power intensities to correspond to the first terrestrial terminal and the second terrestrial terminal, respectively.

According to another aspect, there is also provided an electronic apparatus including a communication device configured to receive data transmission requests from a first terrestrial terminal and a second terrestrial terminal, a memory in which at least one instruction is stored, and a controller configured to identify a first identification number corresponding to the first terrestrial terminal and a second identification number corresponding to the second terrestrial terminal, identify a first reception capability corresponding to the first terrestrial terminal based on the first identification number, identify a second reception capability corresponding to the second terrestrial terminal based on the second identification number, compare the first reception capability of the first terrestrial terminal and the second reception capability of the second terrestrial terminal, and allocate transmission power intensities to correspond to the first terrestrial terminal and the second terrestrial terminal, respectively.

According to the example embodiments, there are one or more effects as below.

For example, it is possible to simply and efficiently implement a non-orthogonal multiple access technology based on a transmission and reception capability of a terminal identified through an identification number of the terminal without needing to use a separate channel and device for monitoring a state of a channel between a transmitter and a receiver. Specifically, it is possible to allocate transmission power based on a transmission and reception capability identified by comparing a predetermined database and an identification (ID) number of a terminal received when a data transmission request is received from the terminal. That is, it is possible to simply and efficiently implement the non-orthogonal multiple access technology by determining a terminal ID-based gain, grouping terminals in a good channel state and terminals in a relatively poor channel state based on the determined gain, and allocating transmission power based on a transmission and reception capability.

It is to be understood that both the foregoing general description and the following detailed description are examples and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this disclosure, illustrate embodiments of the invention and together with the description serve to explain the principles of the invention.

4

Figure 2:
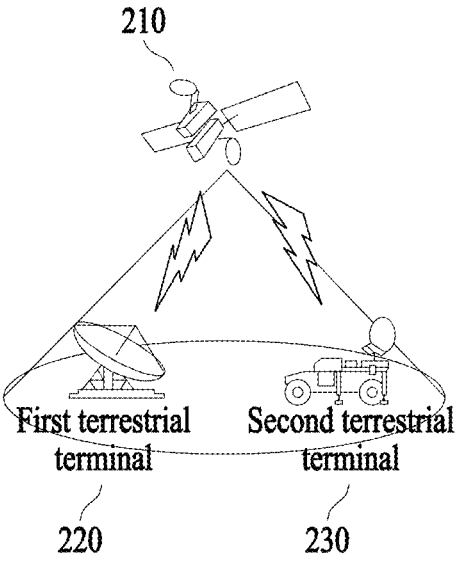

FIG. 2 is a diagram illustrating a beam area in which different types of terrestrial terminals are located according to an example embodiment.

Figure 3A:
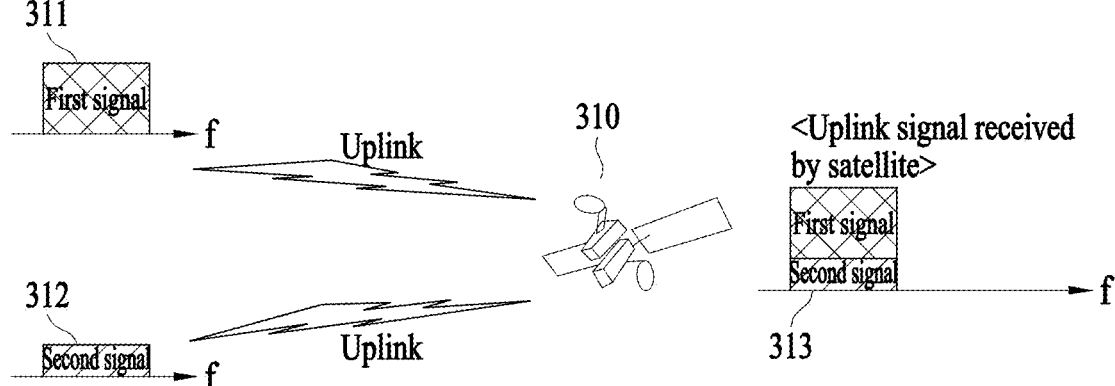

FIG. 3A is a diagram illustrating an uplink-related operation according to an example embodiment.

Figure 3B:
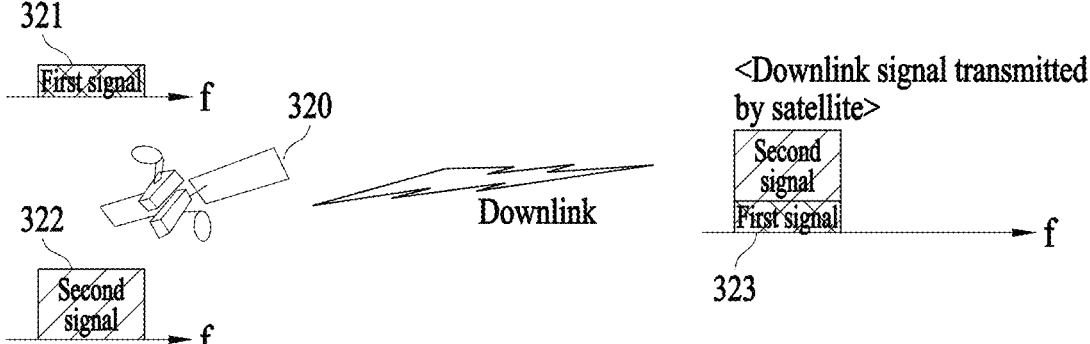

FIG. 3B is a diagram illustrating a downlink-related operation according to an example embodiment.

Figure 4:
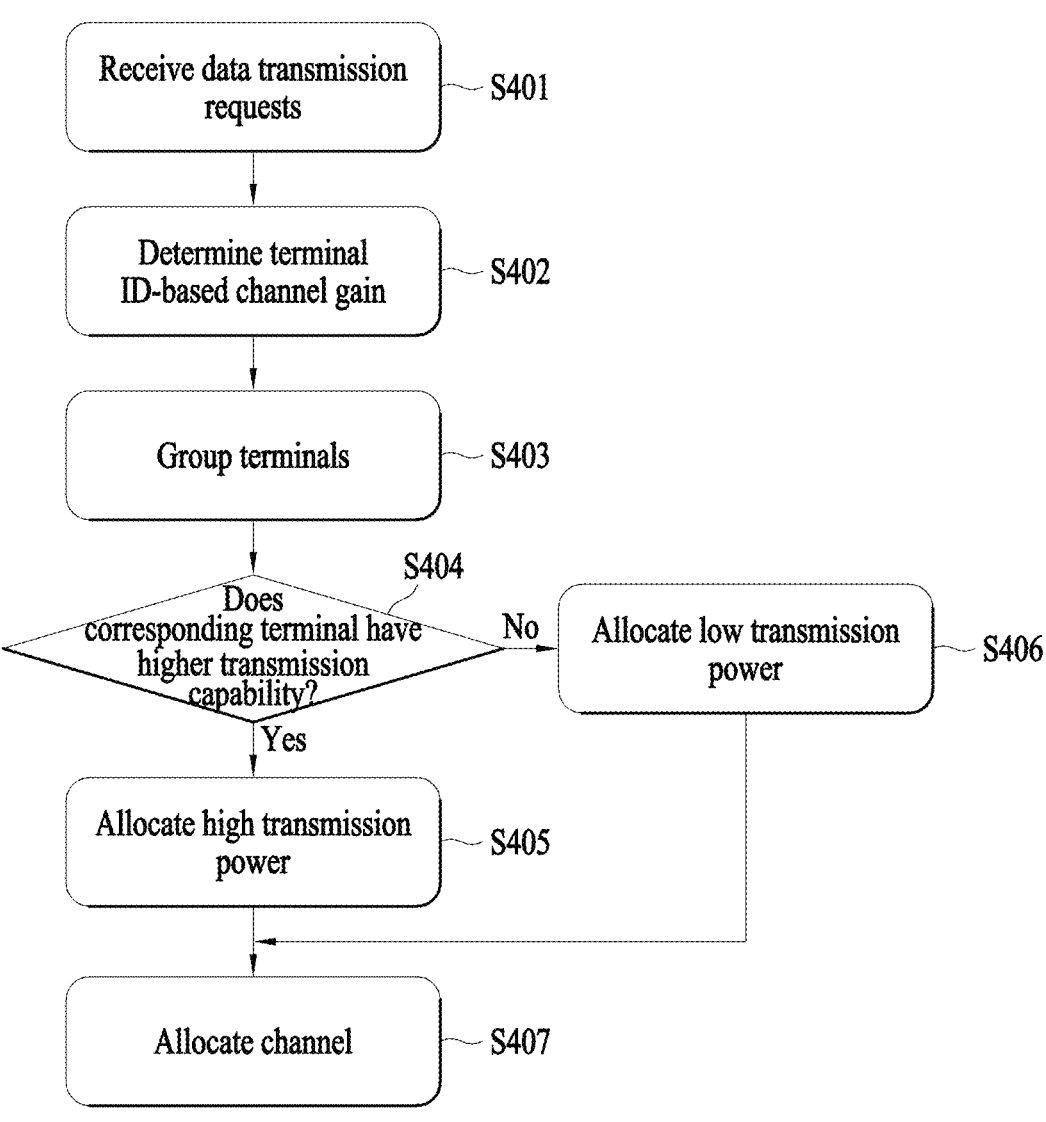

FIG. 4 is a diagram illustrating a transmission power allocation process in an electronic apparatus included in a central station in relation to an uplink according to an example embodiment.

Figure 5:
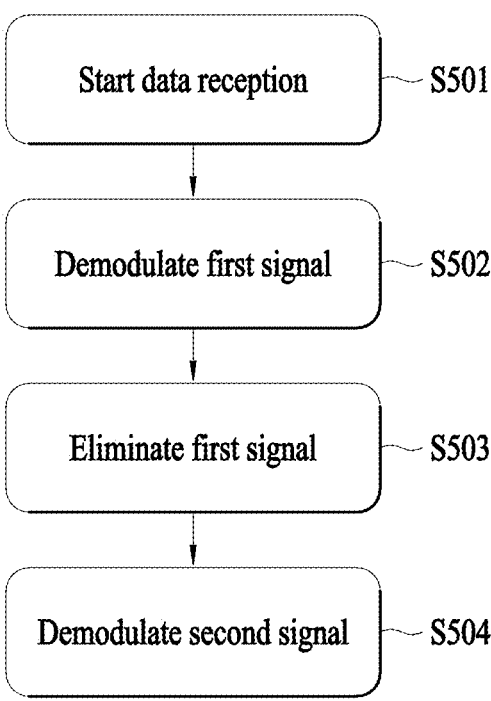

FIG. 5 is a diagram illustrating a process of receiving a signal in relation to an uplink in an electronic apparatus included in a central station according to an example embodiment.

Figure 6:
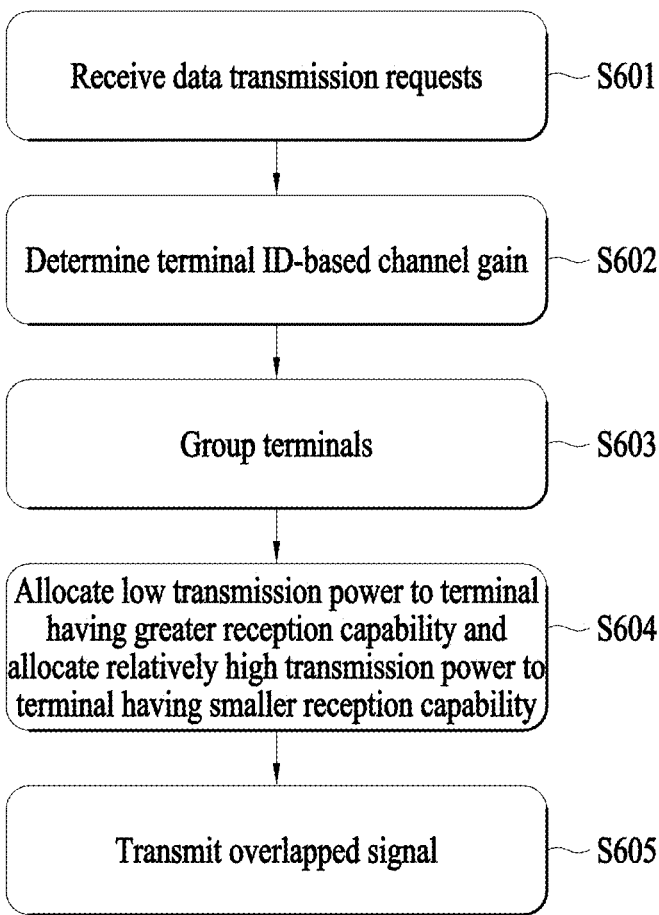

FIG. 6 is a diagram illustrating a signal transmission process in an electronic apparatus included in a central station in relation to a downlink according to an example embodiment.

Figure 7:
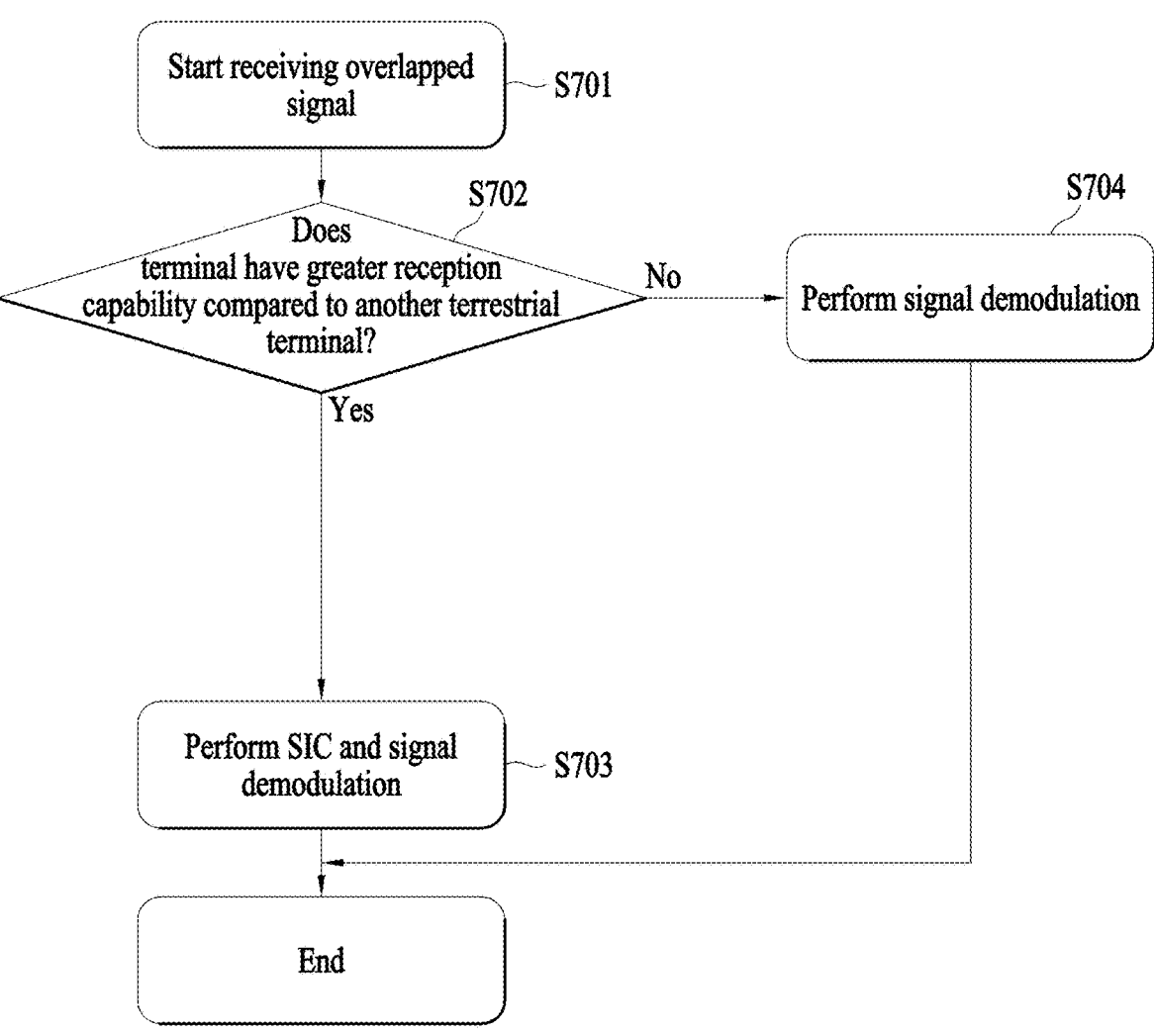

FIG. 7 is a diagram illustrating a process of receiving a signal in a terrestrial terminal in relation to a downlink according to an example embodiment.

FIG. 8 is a flowchart illustrating a method of performing an uplink-related operation in an electronic apparatus.

FIG. 9 is a flowchart illustrating a method of performing a downlink-related operation in an electronic apparatus.

Figure 10:
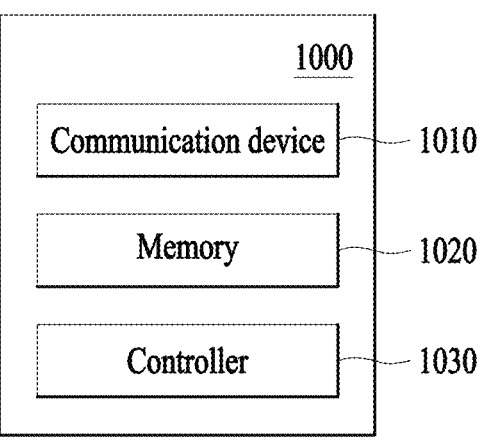

FIG. 10 is a block diagram illustrating an electronic apparatus included in a central station according to an example embodiment.

DETAILED DESCRIPTION

Terms used in embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the content of this disclosure, rather than being simply construed based on names of the terms.

In the disclosure, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

Throughout the disclosure, the expression "at least one of A, B, and C" may include the following meaning: A alone; B alone; C alone; both A and B together; both A and C together; both B and C together; or all three of A, B, and C together.

The term "terminal" mentioned below may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments will be described in detail with reference to the drawings so that those skilled in the art can carry out the present invention. However, the present embodiments may be implemented in various different forms but it is not limited to the example embodiments described herein.

Hereinafter, example embodiments of the present invention will be described with reference to the drawings.

Figure 1:
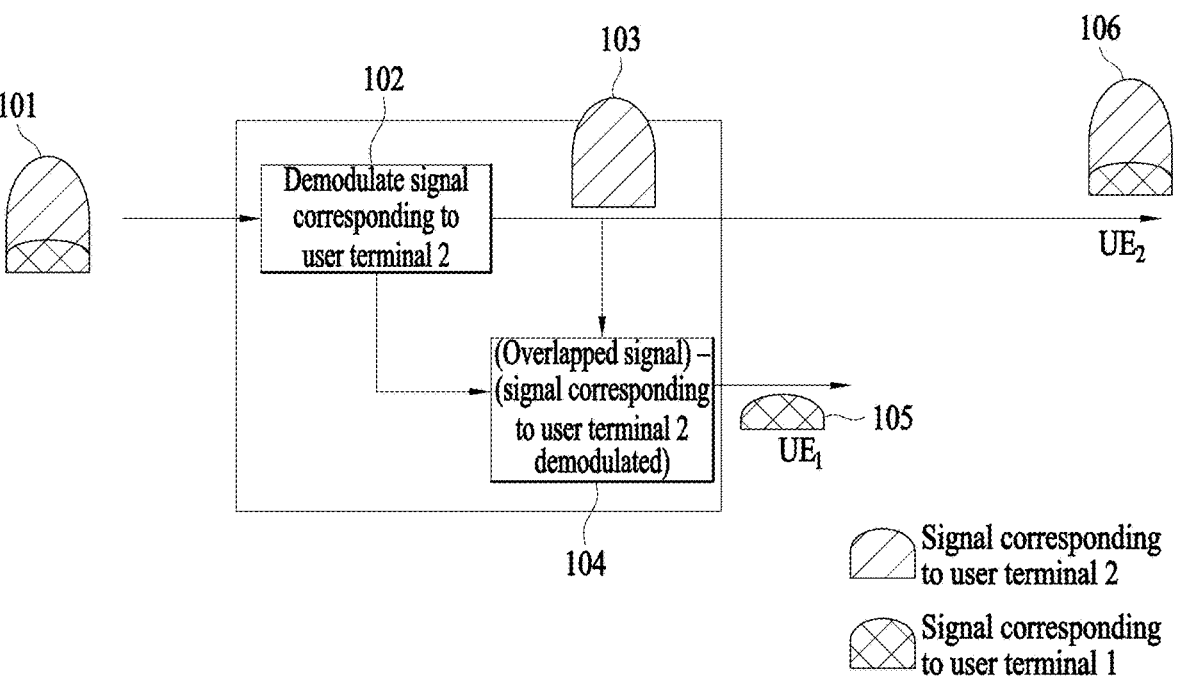
FIG. 1 is a diagram illustrating a communication method related to non-orthogonal multiple access according to an example embodiment.

FIG. 1 is a diagram illustrating a communication method related to non-orthogonal multiple access according to an example embodiment.

Referring to FIG. 1, a transmitting device may transmit an overlapped signal 101 to a user terminal 1 (e.g., user equipment 1 (UE1)) and a user terminal 2 (e.g., user equipment 2 (UE2)). Here, the overlapped signal 101 may include a signal corresponding to the user terminal 1 and a signal corresponding to the user terminal 2.

When a situation of a channel between the transmitting device and the user terminal 2 is relatively poor compared to a situation of a channel between the transmitting device and the user terminal 1, a relatively high transmission power intensity may be allocated to the signal corresponding to the user terminal 2. Due to such a difference between transmission power intensities allocated, the user terminal 1 and the user terminal 2 may demodulate the corresponding signals using different methods as described below.

When the overlapped signal 101 is received by the user terminal 1, the user terminal 1 may perform successive interference cancellation (SIC). Specifically, as indicated by a block 102, the user terminal 1 may demodulate a signal 103 corresponding to the user terminal 2 having the highest signal intensity. After that, a signal corresponding to the user terminal 2 may be regenerated, and as indicated by a block 104, the regenerated signal may be eliminated from the received overlapped signal 101. In this way, a frequency waveform of the signal corresponding to the user terminal 1 may be restored and demodulated so that information is received. Through the above-described process, the user terminal 1 may identify a signal 105 corresponding to the user terminal 1.

Unlike the process of the user terminal 1, in some cases, overlapped signals 101 and 106 may be received by the user terminal 2. In such cases, since a relatively low transmission power intensity is allocated in relation to the signal corresponding to the user terminal 1, the user terminal 2 may determine the signal corresponding to the user terminal 1 to be an interference signal and directly demodulate the signal corresponding to the user terminal 2 in the overlapped signals 101 and 106.

Hereinafter, a technology for implementing non-orthogonal multiple access using a relatively simple method based on a transmission and reception capability of a terminal without monitoring a situation of a channel will be described.

FIG. 2 is a diagram illustrating a beam area in which different types of terrestrial terminals are located according to an example embodiment.

Referring to FIG. 2, in a geostationary orbit satellite communication system, a first terrestrial terminal 220 and a second terrestrial terminal 230 of different types may be located in an antenna beam area of a satellite 210. However, the first terrestrial terminal 220 and the second terrestrial terminal 230 are merely provided as an example, and the present invention is not limited to the example.

In this instance, the first terrestrial terminal 220 may be greater in size compared to the second terrestrial terminal 230. Accordingly, the first terrestrial terminal 220 may have a higher transmission and reception capability than a transmission and reception capability of the second terrestrial terminal 230.

In a satellite communication system, when a plurality of terrestrial terminals having different transmission and reception capabilities such as the first terrestrial terminal 220 and the second terrestrial terminal 230 are located in an antenna beam area of the satellite 210, a channel gain related to each of the terrestrial terminals may vary. Using this, it is possible to implement a non-orthogonal multiple access technique relatively simply and effectively than a technique for monitoring a channel condition.

Specifically, in the satellite communication system, the first terrestrial terminal 220 and the second terrestrial terminal 230 may request resources through a control channel from a central station (e.g., satellite) for resource allocation. At this time, a terminal identification (ID) for identifying a type of each terminal may also be transmitted to the central station (e.g., satellite). For example, while sending the request for resources, the first terrestrial terminal 220 may also transmit an ID for identifying a type of the first terrestrial terminal 220 to the central station. In addition, while sending the request for resources, the second terrestrial terminal 230 may also transmit an ID for identifying a type of the second terrestrial terminal 230 to the central station (e.g., satellite).

In this instance, the central station may allocate transmission power based on a predetermined database (DB) according to a terminal type. For example, the central station may allocate transmission power by identifying the transmission and reception capability of the first terrestrial terminal 220 based on the predetermined database and the type identified based on the ID of the first terrestrial terminal 220. Alternatively, the central station may allocate transmission power by identifying a transmission and reception capability of the second terrestrial terminal 230 based on the predetermined database and the type identified based on the ID of the second terrestrial terminal 230.

FIG. 3A is a diagram illustrating an uplink-related operation according to an example embodiment.

Referring to FIG. 3A, a first terrestrial terminal and a second terrestrial terminal may request a central station 310 to allocate a channel, and the central station 310 may allocate resources at the same frequency for the first terrestrial terminal and the second terrestrial terminal. In other words, when the first terrestrial terminal and the second terrestrial terminal transmit data transmission requests to the central station 310, the central station 310 may allocate resources for the first terrestrial terminal and the second terrestrial terminal using the same frequency.

At this time, the central station 310 may allocate transmission power intensities corresponding to the first terrestrial terminal and the second terrestrial terminal based on terminal IDs and predetermined databases. Here, the terminal ID may be transmitted along with the data transmission request from each terminal to the central station 310.

For example, referring to FIG. 3A, the first terrestrial terminal may transmit the terminal ID and the data transmission request to the central station 310, and the second terrestrial terminal may transmit the terminal ID and the data transmission request to the central station 310. Accordingly, the central station 310 may identify transmission capabilities of the terminals based on the terminal IDs and the predetermined databases. At this time, when the transmission capability of the first terrestrial terminal is greater than the transmission capability of the second terrestrial terminal, an intensity of transmission power allocated by the central station in relation to the first terrestrial terminal may be relatively larger than an intensity of transmission power allocated by the central station in relation to the second terrestrial terminal.

In this instance, the central station 310 may demodulate a signal transmitted by the first terrestrial terminal first. In addition, the central station 310 may demodulate a signal corresponding to the first terrestrial terminal, and then demodulate an interference-canceled signal corresponding to the second terrestrial terminal.

For example, when transmitting the data transmission request to the central station 310, the first terrestrial terminal may transmit the terminal ID together. Also, when transmitting the data transmission request to the central station 310, the second terrestrial terminal may transmit the terminal ID together. In other words, at the time of receiving the data transmission requests from the first terrestrial terminal and the second terrestrial terminal, the central station 310 may receive the terminal IDs. At this time, the central station 310 may identify the transmission capabilities according to comparisons between the terminal IDs and the predetermined databases and determine the transmission power intensities to be allocated. The central station 310 may allocate the transmission power intensities based on the transmission capabilities of the first terrestrial terminal and the second terrestrial terminal, so that the first terrestrial terminal transmits a first signal 311 based on the allocated transmitted transmission power intensity and the second terrestrial terminal transmits a second signal 312 based on the allocated transmitted transmission power intensity. At this time, the central station 310 may demodulate the first signal 311, and then demodulate the second signal 312 in which an interference is canceled.

FIG. 3B is a diagram illustrating a downlink-related operation according to an example embodiment.

Referring to FIG. 3B, a central station 320 may set a transmission signal level based on a reception capability of a terminal identified using predetermined databases and terminal IDs of a first terrestrial terminal and a second terrestrial terminal and transmit, through a downlink, an overlapped signal 323 in which a first signal 321 and a second signal 322 are overlapped. At this time, the overlapped signal 323 may be transmitted at the same frequency from the first terrestrial terminal and the second terrestrial terminal to the central station 320.

In this instance, the central station 320 may identify the reception capability of each terrestrial terminal by comparing the terminal ID and the predetermined database. In the example of FIG. 3A, a higher transmission power intensity may be allocated to a terminal having a relatively higher transmission capability. In contrast, in the example of FIG. 3B, a lower transmission power intensity may be allocated to a terminal having a relatively higher reception capability. For example, when the reception capability of the first terrestrial terminal is relatively greater than the reception capability of the second terrestrial terminal, the central station 320 may allocate a relatively higher transmission power intensity to the second signal corresponding to the second terrestrial terminal compared to the first signal corresponding to the first terrestrial terminal.

The central station 320 may transmit an overlapped signal in which the first signal and the second signal are overlapped based on the allocated transmission power intensities to the first terrestrial terminal and the second terrestrial terminal through the downlink. In other words, the first terrestrial terminal and the second terrestrial terminal may receive the overlapped signal 323 through the downlink. At this time, since the second signal is greater in intensity than the first signal, the first terrestrial terminal may demodulate the second signal first, and then demodulate the first signal in which an interference is canceled. Alternatively, since the intensity of the second signal has a higher level than that of the intensity of the first signal, the second terrestrial terminal may demodulate the second signal directly without canceling the interference.

FIG. 4 is a diagram illustrating a transmission power allocation process in an electronic apparatus included in a central station in relation to an uplink according to an example embodiment.

Referring to FIG. 4, in operation S401, a central station may receive data transmission requests from terrestrial terminals located in an antenna beam area. At this time, each of the terrestrial terminals may transmit the data transmission request along with a terminal ID.

In operation S402, the central station may determine a terminal ID-based channel gain. The central station may determine an uplink-related transmission capability of each terrestrial terminal by comparing the received terminal ID and a predetermined database and determine a channel gain between the corresponding terrestrial terminal and the central station based on the determined transmission capability.

In operation S403, the central station may perform terminal grouping. Specifically, the central station may group a terrestrial terminal having a good channel environment and a terrestrial terminal having a relatively poor channel environment among a plurality of terrestrial terminals and allocate the same frequency to the grouped terminals. At this time, the channel environment may be determined in consideration of a channel gain based on a transmission capability. For example, the first terrestrial terminal having a relatively high transmission capability and the second terrestrial terminal having a relatively low transmission capability may be grouped.

In operation S404, the central station may determine whether the corresponding terminal is a terminal having a higher transmission capability. The transmission capability may be determined according to a comparison between a terminal ID and a predetermined database. The central station may allocate high transmission power to a terminal having a greater transmission capability in operation S405 and allocate low transmission power to a terminal having a smaller transmission capability in operation S406. For example, the central station may allocate relatively high transmission power to the first terrestrial terminal having a relatively greater transmission capability, and allocate relatively low transmission power to the second terrestrial terminal having a relatively smaller transmission capability.

In operation S407, the central station may allocate channels in response to the data transmission requests of the terrestrial terminals. At this time, using the allocated channels, the terrestrial terminals may transmit signals having the allocated transmission intensities to the central station.

FIG. 5 is a diagram illustrating a process of receiving a signal in relation to an uplink in an electronic apparatus included in a central station according to an example embodiment.

Referring to FIG. 5, in operation S501, a central station may start receiving data from each terrestrial terminal using the channel allocated in operation S407. In this instance, it is assumed that relatively high transmission power is allocated to a first signal corresponding to the first terrestrial terminal and relatively low transmission power is allocated to a second signal corresponding to the second terrestrial terminal.

In operation S502, the central station may demodulate the first signal to which the relatively high transmission power is allocated. Then, in operation S503, the central station may eliminate the first signal from received signals. In operation S504, the central station may demodulate the second signal in which an interference is canceled.

FIG. 6 is a diagram illustrating a signal transmission process in an electronic apparatus included in a central station in relation to a downlink according to an example embodiment.

Referring to FIG. 6, in operation S601, a central station may receive data transmission requests from terrestrial terminals located in an antenna beam area. At this time, each of the terrestrial terminals may transmit the data transmission request along with a terminal ID.

In operation S602, the central station may determine a terminal ID-based channel gain. The central station may determine a downlink-related reception capability of each of the terrestrial terminals by comparing the received terminal ID and a predetermined database and determine a channel gain between the central station and each of the terrestrial terminals based on the determined reception capability.

In operation S603, the central station may perform terminal grouping. Specifically, the central station may group a terrestrial terminal having a good channel environment and a terrestrial terminal having a relatively poor channel environment among a plurality of terrestrial terminals and allocate the same frequency to the grouped terminals. At this time, the channel environment may be determined in consideration of a channel gain based on the reception capability. For example, the first terrestrial terminal having a relatively high reception capability and the second terrestrial terminal having a relatively low reception capability may be grouped.

Unlike the example of FIG. 4, the central station may generate signals by allocating relatively low transmission power to the first terrestrial terminal having a greater reception capability and allocating relatively high transmission power to the second terrestrial terminal having a smaller reception capability in operation S604. Also, the central station may overlap the generated signals corresponding to the first terrestrial terminal and the second terrestrial terminal and transmit an overlapped signal. That is, unlike the transmission capability, relatively low transmission power may be allocated to a terrestrial terminal having a high reception capability.

The central station may overlap the signals corresponding to the first terrestrial terminal and the second terrestrial terminal and transmit an overlapped signal in operation S605. At this time, the overlapped signal may be a signal in which the signals corresponding to the terrestrial terminals having the transmission power intensities allocated in operation S604 are overlapped.

FIG. 7 is a diagram illustrating a process of receiving a signal in a terrestrial terminal in relation to a downlink according to an example embodiment.

Referring to FIG. 7, in operation S701, a terrestrial terminal may start receiving the overlapped signal generated in operation S605 from a central station. At this time, it is assumed that relatively low transmission power is allocated to a first signal corresponding to a first terrestrial terminal and relatively high transmission power is allocated to a second signal corresponding to a second terrestrial terminal.

In operation S702, the terrestrial terminal may be compared to another terrestrial terminal to determine whether the terrestrial terminal is a terminal having a greater reception capability. When the terrestrial terminal is the terminal having a greater reception capability, in operation S703, the terrestrial terminal may perform successive interference cancellation and then perform signal demodulation. When the terrestrial terminal is a terminal having a smaller reception capability, the terrestrial terminal may directly perform signal demodulation in operation S704. For example, the second terrestrial terminal may demodulate the second signal directly, and the first terrestrial terminal may demodulate the first signal after the successive interference cancellation.

FIG. 8 is a flowchart illustrating a method of performing an uplink-related operation in an electronic apparatus. Here, the electronic apparatus is a device included in a central station, and may be a device that controls an operation of the central station.

Referring to FIG. 8, in operation S810, the electronic apparatus may receive data transmission requests from a first terrestrial terminal and a second terrestrial terminal. In operation S820, the electronic apparatus may identify a first identification number corresponding to the first terrestrial terminal and a second identification number corresponding to the second terrestrial terminal. In operation S830, the electronic apparatus may identify a first transmission capability corresponding to the first terrestrial terminal based on the first identification number and identify a second transmission capability corresponding to the second terrestrial terminal based on the second identification number. In operation S840, the electronic apparatus may compare the first transmission capability of the first terrestrial terminal and the second transmission capability of the second terrestrial terminal and allocate transmission power intensities to correspond to the first terrestrial terminal and the second terrestrial terminal, respectively. The electronic apparatus may allocate channels used for receiving signals having the allocated transmission power intensities in response to the data transmission requests. The electronic apparatus may determine a transmission capability for a terrestrial terminal by comparing an identification number corresponding to a terminal and a predetermined database. When the first transmission capability is relatively higher than the second transmission capability, a relatively high transmission power intensity may be allocated to the first terrestrial terminal compared to the second terrestrial terminal. The electronic apparatus may demodulate a first signal transmitted by the first terrestrial terminal in signals received based on the transmission power intensities corresponding to the first terrestrial terminal and the second terrestrial terminal, eliminate the first signal in the received signals, and then demodulate a second signal in the received signals in which the first signal is eliminated.

FIG. 9 is a flowchart illustrating a method of performing a downlink-related operation in an electronic apparatus. Here, the electronic apparatus is a device included in a central station, and may be a device that controls an operation of the central station.

Referring to FIG. 9, in operation S910, the electronic apparatus may receive data transmission requests from a first terrestrial terminal and a second terrestrial terminal. In operation S920, the electronic apparatus may identify a first identification number corresponding to the first terrestrial terminal and a second identification number corresponding to the second terrestrial terminal. In operation S930, the electronic apparatus may identify a first reception capability corresponding to the first terrestrial terminal based on the first identification number and identify a second reception capability corresponding to the second terrestrial terminal based on the second identification number. In operation S940, the electronic apparatus may compare the first reception capability of the first terrestrial terminal and the second reception capability of the second terrestrial terminal and allocate transmission power intensities to correspond to the first terrestrial terminal and the second terrestrial terminal, respectively. The first reception capability and the second reception capability may be identified from a predetermined database corresponding to a reception capability of a terrestrial terminal based on the first identification number and the second identification number. When the first reception capability is relatively higher than the second reception capability, the electronic apparatus may allocate a relatively low transmission power intensity to the first terrestrial terminal compared to the second terrestrial terminal. The electronic apparatus may overlap a first signal corresponding to the first terrestrial terminal having the allocated transmission power intensity and a second signal corresponding to the second terrestrial terminal having the allocated transmission power intensity and transmit the overlapped signal through the downlink.

FIG. 10 is a block diagram illustrating an electronic apparatus included in a central station according to an example embodiment.

According to an example embodiment, an electronic apparatus 1000 included in a central station may include a communication device 1010, a memory 1020, and a controller 1030. FIG. 10 illustrates only components of the electronic apparatus 1000 related to the present embodiment. Accordingly, it is apparent to those skilled in the art that other general-purpose components may be further included in the electronic apparatus 1000 in addition to the components illustrated in FIG. 10. Since the foregoing description is also applicable to the electronic apparatus 1000, repeated descriptions will be omitted.

The communication device 1010 may perform wired and wireless communication using communication technologies such as global system for mobile communication (GSM), code division multi-access (CDMA), long term evolution (LTE), fifth-generation (5G), wireless LAN (WLAN), wireless-fidelity (Wi-Fi), Bluetooth™, radio frequency identification (RFID), infrared data association (IrDA), ZigBee, near field communication (NFC), and the like, for example.

The controller 1030 may control an operation of the electronic apparatus 1000 overall and process data and a signal. The controller 1030 may include at least one hardware unit. In addition, the controller 1030 may operate by one or more software modules generated by executing program codes stored in the memory 1020. The controller 1030 may execute the program codes stored in the memory 1020, thereby controlling the overall operation of the electronic apparatus 1000 and processing the data and the signal.

As an uplink-related operation, the controller 1030 may identify a first identification number corresponding to a first terrestrial terminal and a second identification number corresponding to a second terrestrial terminal, identify a first transmission capability corresponding to the first terrestrial terminal based on the first identification number, identify a second transmission capability corresponding to the second terrestrial terminal based on the second identification number, compare the first transmission capability of the first terrestrial terminal and the second transmission capability of the second terrestrial terminal, and allocate transmission power intensities to correspond to the first terrestrial terminal and the second terrestrial terminal, respectively.

As a downlink-related operation, the controller 1030 may identify a first reception capability corresponding to a first terrestrial terminal based on a first identification number, identify a second reception capability corresponding to a second terrestrial terminal based on a second identification number, compare the first reception capability of the first terrestrial terminal and the second reception capability of the second terrestrial terminal, and allocate transmission power intensities to correspond to the first terrestrial terminal and the second terrestrial terminal, respectively.

The electronic apparatus or terminal described herein may include a permanent storage such as a disk drive, a communication port for handling communications with external devices, and user interface devices such as a touch panel, a key, and a button. The methods that are implemented as software modules or algorithms may be stored as program instructions or computer-readable codes executable by the processor on a computer-readable recording medium. Here, examples of the computer-readable recording medium include magnetic storage media (e.g., read only memory (ROM), random access memory (RAM), floppy disk, or hard disk), optically readable media (e.g., compact disk-read only memory (CD-ROM) or digital versatile disk (DVD)), etc. The computer-readable recording medium may be distributed over network coupled computer systems, and thus, the computer-readable code may be stored and executed in a distributed fashion. This medium may be read by the computer, stored in the memory, and executed by the processor.

The present embodiments may be described in terms of functional block components and various processing steps. Such functional blocks may be realized by any number of hardware and/or software components configured to perform specified functions. For example, embodiments may employ various integrated circuit (IC) components, e.g., memory elements, processing elements, logic elements, look-up tables, and the like, which may carry out a variety of functions under the control of one or more microprocessors or other control devices. Similarly, where the elements are implemented using software programming or software elements, the present embodiments may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the embodiments described herein could employ any number of conventional techniques for electronics configuration, signal processing and/or control, data processing and the like. The terms "mechanism," "element," "means," and "configuration" are used broadly and are not limited to mechanical or physical embodiments. These terms may include meaning of a series of routines of software in association with a processor, for example.

It will be apparent to those skilled in the art that various modifications and variations can be made in the embodiments of the present invention without departing form the spirit or scope of the invention. Thus, it is intended that present invention cover the modifications and variations of this invention provided they come within the scope of the appended claims and their equivalents.

What is claimed is:

1. A method of performing an uplink-related operation in an electronic apparatus, the method comprising:

receiving data transmission requests from a first terrestrial terminal and a second terrestrial terminal;

identifying a first identification number corresponding to the first terrestrial terminal and a second identification number corresponding to the second terrestrial terminal;

identifying a first transmission capability corresponding to the first terrestrial terminal based on the first identification number and identifying a second transmission capability corresponding to the second terrestrial terminal based on the second identification number; and comparing the first transmission capability of the first terrestrial terminal and the second transmission capability of the second terrestrial terminal and allocating transmission power intensities to correspond to the first terrestrial terminal and the second terrestrial terminal, respectively, wherein when the first transmission capability is relatively higher than the second transmission capability, the allocating of the transmission power intensities comprises allocating a relatively high transmission power intensity to the first terrestrial terminal compared to the second terrestrial terminal.

2. The method of claim 1, further comprising:

allocating channels used for receiving signals having the allocated transmission power intensities in response to the data transmission requests.

3. The method of claim 1, further comprising:

demodulating a first signal transmitted by the first terrestrial terminal in signals received based on the transmission power intensities corresponding to the first terrestrial terminal and the second terrestrial terminal, and then demodulating a second signal in the received signals in which the first signal is eliminated.

4. The method of claim 1, wherein the first transmission capability and the second transmission capability are identified from a predetermined database corresponding to a transmission capability of a terrestrial terminal based on the first identification number and the second identification number.

5. A method of performing a downlink-related operation in an electronic apparatus, the method comprising:

receiving data transmission requests from a first terrestrial terminal and a second terrestrial terminal;

identifying a first identification number corresponding to the first terrestrial terminal and a second identification number corresponding to the second terrestrial terminal;

identifying a first reception capability including a first channel gain corresponding to the first terrestrial terminal based on the first identification number and identifying a second reception capability including a second channel gain corresponding to the second terrestrial terminal based on the second identification number; and comparing the first reception capability of the first terrestrial terminal and the second reception capability of the second terrestrial terminal and allocating transmission power intensities to correspond to the first terrestrial terminal and the second terrestrial terminal, respectively, wherein a type of the first terrestrial terminal is identified from the first identification number and the first reception capability is identified from a predetermined database based on the type of the first terrestrial terminal, and wherein a type of the second terrestrial terminal is identified from the second identification number and the second reception capability is identified from the predetermined database based on the type of the second terrestrial terminal.

6. The method of claim 5, wherein when the first reception capability is relatively higher than the second reception capability, the allocating of the transmission power intensities comprises allocating a relatively low transmission power intensity to the first terrestrial terminal compared to the second terrestrial terminal.

7. The method of claim 6, further comprising:

overlapping a first signal corresponding to the first terrestrial terminal with a second signal corresponding to the second terrestrial terminal and transmitting an overlapped signal through the downlink, wherein the first signal and the second signal have the allocated transmission power intensities.

8. An electronic apparatus comprising:

a communication device that receives data transmission requests from a first terrestrial terminal and a second terrestrial terminal;

a memory in which at least one instruction is stored; and a controller that identifies a first identification number corresponding to the first terrestrial terminal and a second identification number corresponding to the second terrestrial terminal, identify a first transmission capability corresponding to the first terrestrial terminal based on the first identification number, identify a second transmission capability corresponding to the second terrestrial terminal based on the second identification number, compare the first transmission capability of the first terrestrial terminal and the second transmission capability of the second terrestrial terminal, and allocate transmission power intensities to correspond to the first terrestrial terminal and the second terrestrial terminal, respectively, wherein when the first transmission capability is relatively higher than the second transmission capability, the allocating of the transmission power intensities comprises allocating a relatively high transmission power intensity to the first terrestrial terminal compared to the second terrestrial terminal.

9. An electronic apparatus comprising:

a communication device that receives data transmission requests from a first terrestrial terminal and a second terrestrial terminal;

a memory in which at least one instruction is stored; and a controller identifies a first identification number corresponding to the first terrestrial terminal and a second identification number corresponding to the second terrestrial terminal, identify a first reception capability including a first channel gain corresponding to the first terrestrial terminal based on the first identification number, identify a second reception capability including a second channel gain corresponding to the second terrestrial terminal based on the second identification number, compare the first reception capability of the first terrestrial terminal and the second reception capability of the second terrestrial terminal, and allocate transmission power intensities to correspond to the first terrestrial terminal and the second terrestrial terminal, respectively,

wherein a type of the first terrestrial terminal is identified
from the first identification number and the first recep-
tion capability is identified from a predetermined data-
base based on the type of the first terrestrial terminal,
and wherein a type of the second terrestrial terminal is iden-
tified from the second identification number and the
second reception capability is identified from the pre-
determined database based on the type of the second
terrestrial terminal.

\* \* \* \* \*

16